Figure 1:
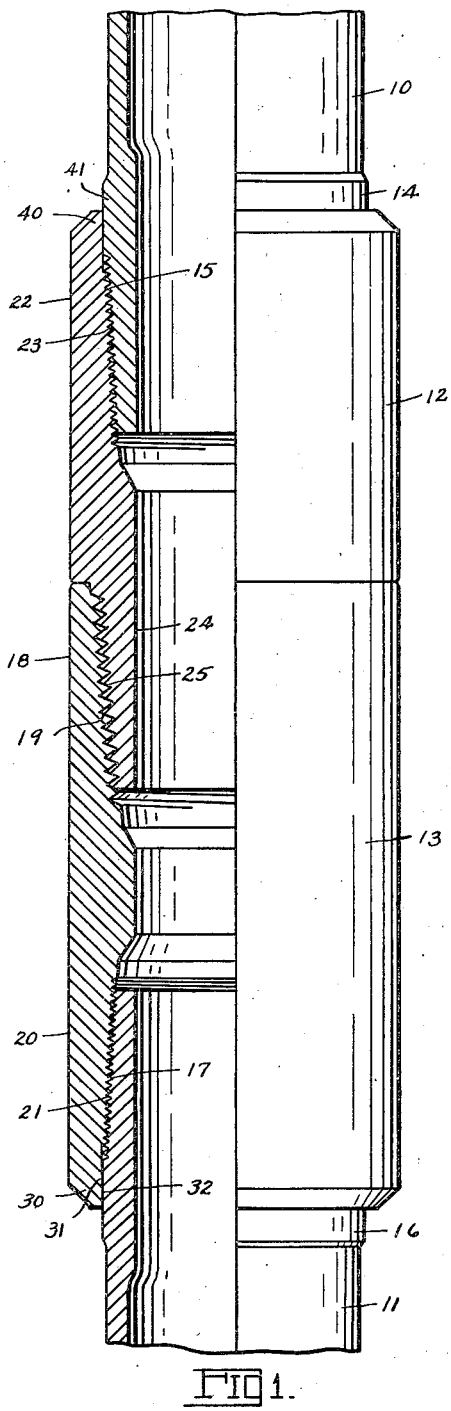

Sept. 15, 1936.         W. L. CHILDS ET AL         2,054,118
                TOOL JOINT AND METHOD OF MAKING SAME
                       Filed June 11, 1935

William L. Childs
George G. Harrington
                INVENTOR.
BY J. Vincent Martin,
   and
   John W. Poteet, Jr.
                ATTORNEYS.

Patented Sept. 15, 1936

2,054,118

UNITED STATES PATENT OFFICE 2,054,118

TOOL JOINT AND METHOD OF MAKING SAME

William L. Childs and George G. Harrington, Houston, Tex., assignors to Reed Roller Bit Company, Houston, Tex., a corporation of Texas Application June 11, 1935, Serial No. 26,061

7 Claims. (Cl. 29—148.2)

This invention relates to the construction of and assembling or interconnecting of tubular members, and more especially to what are commonly called tool joints.

In conventional drill pipes and tool joints the connection is generally made by means of a tapered thread, the tool joint being screwed on the drill pipe until sufficient tightness is obtained by the friction of the tapered thread. In screwing the tapered thread together the outer member expands and the inner member contracts due to the thread being tapered and the fact that the friction of the thread alone governs the amount of make-up. This contraction of the inner member and expansion of the outer member in make-up sets up in the joint a very great initial strain, i. e., when they are screwed together extremely tightly. When the pipe is further stressed in service the added stresses which will cause failure are much less than would be the case with a joint which was not made up so tightly or with so much initial stress. Generally these tool joints fail, not in the joint, but in the pipe or tubing, and most often in the neighborhood of the first thread on the tubing. In the conventional joint the end portion of the joint member extends outwardly from the thread and, fitting loosely the adjacent portion of the pipe, retains substantially its original diameter as the joint is tightened, thereby resisting the expansion of the first engaged thread of the tool joint, and causing a great concentration of stress at said thread.

One object of this invention is to construct a tool joint which will be substantially free of the foregoing difficulties. Another object is to avoid highly localized stresses. A further object is to facilitate the securement of parts. Yet further objects reside in the securement of the parts in locked engagement, the attainment of substantially predetermined stress conditions in a joint, a rigid, safe assembling of the parts, the effective preclusion of disengagement of the members when in use, the avoidance of delays due to breakage, etc. Other objects and advantages will appear in the subjoined specification.

By the present invention these disadvantages are overcome and the objects attained through the assembling of the parts in a predetermined manner. In accordance with the present invention the tube member and joint member are provided with substantially concentric cylindrical surface portions which are arranged to securely grip each other when they are connected together, and to distribute the stresses over a larger area of the pipe, and especially to avoid the localization of the stress in the first notch of the pipe thread. The counterbore of the joint member is shrunk on the tube to provide a predetermined stress condition over a greater area of the pipe. The counterbore is preferably heated and allowed to shrink into an extremely tight position on the tube, in such a manner as to provide considerable resistance to torsion, the making up of the joint much tighter with respect to the torque required, and with a proportionate less stress set up in the two members.

Figure 2:
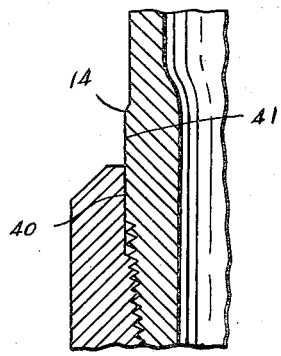
Figure 3:
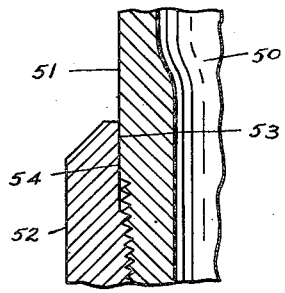

In the drawing Fig. 1 is a vertical elevation partly in section of a joint; Fig. 2 is an enlarged view of an exteriorly up-set joint. Fig. 3 is a similarly enlarged portion of a flush joint.

Considering the drawing in greater detail, the invention is shown in Fig. 1 as providing a tool joint fastening two parts of a tubing together. The upper section 10 has a pin member 12 secured to it, and a lower tube 11 has a socket member 13 fastened to it, the pin and socket being fastened together to complete the joint.

The upper tube section 10 is exteriorly up-set at 14, being substantially cylindrical and concentric with the axis of the tubing, and having a tapered threaded pin portion 15 extending therefrom to the end of the tube section. The lower tube section 11 is similarly exteriorly up-set at 16, and has a tapered threaded pin portion 17.

The socket member 13 has an upper socket portion 18 with a coarse thread 19 therein arranged for engagement with a similar coarse thread 25 on the pin portion 24 of the pin member 12. The lower socket portion 20 of the socket member carries thereon a fine thread 21, which latter is arranged to engage the tapered thread 17 on the pin portion of the tube 11. This arrangement of the parts allows the joint to be rapidly broken at the coarse thread 19—25 without in any manner substantially affecting the fine threaded connection between the tube and joint members. The pin member 12 is similarly provided with a socket portion 22 having a fine tapered thread 23 arranged to engage the thread 15 on the tube 10.

The annular portion 30 of the socket is preferably provided with a small interior wall or counter-bore 31. A corresponding portion 40 is provided on the pin member. The tubing is provided with complemental cylindrical wall portions being the portion 32 on tube part 11, and 41 on tube part 10. These portions are arranged to have a substantial longitudinal extent so that after their accurate machining relatively long juxtaposed surfaces are obtained, resulting in use in a substantial area of distributed stress condition.

To obtain a predetermined stress condition over a large area and a firm make up of the threads upon the socket and pin members, the portions 30 and 40 are heated before assembling on the tube. These members are then assembled to the tube sections, preferably with a hand-tight fit, and either artificially cooled or allowed to cool gradually, or under other predetermined conditions, so that a shrink fit results in the juxtaposed areas between the pin and tubing members at 40—41, and between the socket and tube members 30—32. After the heated part has cooled sufficiently and a predetermined stress condition obtained between the joint member and tube member, the parts are preferably made up tightly in a machine operation to assure the proper torsional resistance between the parts and the engagement of the threads substantially throughout.

Similar construction is adapted to flush joints, for example as in Fig. 3 wherein the tubing member 50 has a flush outer surface 51 assembled to a socket or pin member 52 with its appropriate counterbore 54 shrunk upon the surface 53 of the tube.

It is also contemplated by this invention that the tubing or drill stem elements and the tool joint elements may be relatively interchanged. For example, the joint member 12 may be exteriorly threaded with an exterior cylindrical surface and the tool joint 10 may be interiorly threaded for complemental engagement with the threaded portion of the member 12, and have an interiorly cylindrical surface for complemental engagement with the corresponding cylindrical surface on the joint member 12, and in this instance a portion of the tubing 10 will be heated in contradistinction to the heating of a portion of the tool joint member, and the tubing will be allowed to shrink on the tool joint. This in substance contemplates a mere reversal of the component parts.

The manner of assembling the parts, and resulting structure, avoid localized stress conditions and very materially aid in the avoidance of conditions heretofore encountered.

One particular embodiment of the invention has been illustrated, and modifications within the true spirit and scope of the same are aimed to be covered by the hereto appended claims.

I claim:

1. A tool joint comprising a pair of tube sections each having a threaded portion and an adjacent smooth portion, and a pair of pin and socket joint members connected together, said pin and socket joint members each having a threaded portion and an adjacent smooth portion engaged with the threaded and smooth portions, respectively, of one of said tube sections, the outside diameter of the smooth portions of said tube sections being slightly greater than the internal diameter of the smooth portions of said joint members, the engaged smooth portions of the respective tube sections and joint members being shrunk together.

2. A tool joint comprising a part having an externally threaded portion thereon and an externally smooth portion adjacent said threaded portion, and a second part having an internally threaded portion and an internally smooth portion adjacent its threaded portion, said externally smooth portion being of a diameter slightly greater than the diameter of said internally smooth portion, the threaded and smooth portions of said parts being complemental to and in engagement with each other respectively, said smooth portions being shrunk together.

3. A tool joint comprising a part having an externally threaded portion thereon and an externally cylindrical portion adjacent said threaded portion, and a second part having an internally threaded portion and an internally cylindrical portion adjacent its threaded portion, said externally cylindrical portion being of a diameter slightly greater than the diameter of said internally cylindrical portion, the threaded and cylindrical portions of said parts being complemental to and in engagement with each other respectively, said cylindrical portions being shrunk together.

4. A tool joint assembly comprising a tube member having an external tapered threaded portion, and an external cylindrical portion adjacent the inner end of said threaded portion, said tube member at said cylindrical portion being internally and externally upset; and a joint member having an internal tapered threaded portion, and an internal cylindrical portion adjacent the outer end of said threaded portion; said threaded portions and said cylindrical portions being interengageable, the outside diameter of said tube member cylindrical portion being slightly greater than the internal diameter of said joint member cylindrical portion, said joint member cylindrical portion being slidable on said tube member cylindrical portion when said threads are screwed together, whereby concentration of stresses at the outer end of the tube member threaded portion incident to the expansion of said joint member and the compression of said tube member when said members are screwed together is prevented and said stresses are distributed over said threaded and cylindrical portions.

5. A tool joint assembly comprising a tube member having an external tapered threaded portion, and an external cylindrical portion adjacent the inner end of said threaded portion, said cylindrical portion of said tube member being of a diameter not less than the diameter of the body of said tube member; and a joint member having an internal tapered threaded portion, and an internal cylindrical portion adjacent the outer end of said threaded portion; said threaded portions and said cylindrical portions being interengageable, the outside diameter of said tube member cylindrical portion being slightly greater than the internal diameter of said joint member cylindrical portion, said joint member cylindrical portion being slidable on said tube member cylindrical portion when said threads are screwed together, whereby concentration of stresses at the outer end of the tube member threaded portion incident to the expansion of said joint member and the compression of said tube member when said members are screwed together is prevented and said stresses are distributed over said threaded and cylindrical portions.

6. A tool joint assembly comprising a tube member having an external tapered threaded portion, and an external cylindrical portion adjacent the inner end of said threaded portion; and a joint member having an internal tapered threaded portion, and an internal cylindrical portion adjacent the outer end of said threaded portion; said threaded portions and said cylindrical portions being interengageable, the outside diameter of said tube member cylindrical portion being slightly greater than the internal diameter of said joint member cylindrical portion, said joint member cylindrical portion being slidable on said tube member cylindrical portion when said threads are screwed together, whereby concentration of stresses at the outer end of the tube member threaded portion incident to the expansion of said joint member and the compression of said tube member when said members are screwed together is prevented and said stresses are distributed over said threaded and cylindrical portions.

7. The method of assembling a tool joint assembly comprising a tube member having an external tapered threaded portion, and an external cylindrical portion adjacent the inner end of said threaded portion; and a joint member having an internal tapered threaded portion, and an internal cylindrical portion adjacent the outer end of said threaded portion; said threaded portions and said cylindrical portions being interengageable, the outside diameter of said tube member cylindrical portion being slightly greater than the internal diameter of said joint member cylindrical portion, which consists in heating the cylindrical portion of said joint member, and screwing said joint member on said tube member to effect a relatively loose engagement of said cylindrical portions and said threaded portions, permitting said joint member cylindrical portion to cool and shrink upon said tube member cylindrical portion, and then screwing said joint member tightly on said tube member to effect a relatively tight engagement of said threaded portions, and thereby preventing concentration of stresses at the outer end of the tube member threaded portion incident to the expansion of said joint member and the compression of said tube member when said members are screwed tightly together, and causing said stresses to be distributed over said threaded and cylindrical portions.

WILLIAM L. CHILDS.
GEORGE G. HARRINGTON.